(12) United States Patent
Brown et al.

(10) Patent No.: US 10,948,151 B1
(45) Date of Patent: Mar. 16, 2021

(54) VEHICLE HIGH BEAM WITH SELECTIVE DIRECTIONAL ILLUMINATION

(71) Applicants: Roy M. Brown, Bloomington, IN (US); Caryl D. Brown, Bloomington, IN (US)

(72) Inventors: Roy M. Brown, Bloomington, IN (US); Caryl D. Brown, Bloomington, IN (US)

( * ) Notice: Subject to any disclaimer, the term of this patent is extended or adjusted under 35 U.S.C. 154(b) by 0 days.

(21) Appl. No.: 16/834,479

(22) Filed: Mar. 30, 2020

Related U.S. Application Data

(60) Provisional application No. 62/825,308, filed on Mar. 28, 2019.

(51) Int. Cl.
| | | |
|---|---|---|
| *B60Q 1/04* | (2006.01) | |
| *F21S 41/40* | (2018.01) | |
| *B60Q 1/00* | (2006.01) | |
| *F21S 41/663* | (2018.01) | |
| *F21S 41/19* | (2018.01) | |
| *F21W 102/14* | (2018.01) | |

(52) U.S. Cl.
CPC ............ *F21S 41/40* (2018.01); *B60Q 1/0088* (2013.01); *B60Q 1/04* (2013.01); *F21S 41/192* (2018.01); *F21S 41/663* (2018.01); *B60Q 2300/056* (2013.01); *B60Q 2300/42* (2013.01); *F21W 2102/14* (2018.01)

(58) Field of Classification Search
CPC ........ F21S 41/192; F21S 41/40; F21S 41/663; F21S 41/10; F21S 41/13; F21S 43/14; F21S 43/10; B60Q 1/0088; B60Q 2300/056; B60Q 2300/42; B60Q 1/0041; F21W 2102/14
See application file for complete search history.

(56) References Cited

U.S. PATENT DOCUMENTS

| | | | | |
|---|---|---|---|---|
| 1,480,428 | A | * | 1/1924 | Wales .................. F21S 41/323 362/243 |
| 6,443,693 | B1 | | 9/2002 | Eberhardt |
| 7,237,928 | B2 | | 7/2007 | Takeda et al. |
| 7,364,333 | B2 | | 4/2008 | Kurz et al. |
| 7,755,294 | B2 | | 7/2010 | Shelton et al. |
| 8,862,336 | B2 | | 10/2014 | Dierks et al. |
| 10,029,606 | B2 | | 7/2018 | Foltin |
| 2004/0228139 | A1 | | 11/2004 | Taniuchi |
| 2007/0190849 | A1 | * | 8/2007 | Yamamoto ............ F21S 41/192 362/543 |
| 2009/0167188 | A1 | | 7/2009 | Mueller et al. |
| 2015/0103550 | A1 | * | 4/2015 | Ting ........................ F21S 45/48 362/519 |

\* cited by examiner

*Primary Examiner* — Y M. Quach Lee
(74) *Attorney, Agent, or Firm* — Cramer Patent & Design, PLLC; Aaron R. Cramer

(57) ABSTRACT

A system and method involve driver-side high beams to be selectively deactivated for oncoming traffic. It is intended to allow passenger-side high beams to continue operation to preserve the driver's peripheral vision. The driver's side high beam is manually controlled by a separate switch. During use, when an oncoming vehicle approaches, the activation of the switch allows the driver to deactivate only the driver side high beam while the passenger side high beam remains activated. This produces a situation in which the oncoming driver is no longer blinded, but the vehicle driver still maintains the extended vision of the high beam on the left-hand side of the vehicle.

17 Claims, 4 Drawing Sheets

VEHICLE HIGH BEAM WITH SELECTIVE DIRECTIONAL ILLUMINATION

RELATED APPLICATIONS

The present invention was first described in and claims the benefit of U.S. Provisional Patent Application No. 62/825,308 filed on Mar. 28, 2019, the entire disclosures of which are incorporated herein by reference.

FIELD OF THE INVENTION

The present invention relates generally to a vehicle high beam and more specifically to a vehicle high beam having selective directional illumination.

BACKGROUND OF THE INVENTION

While driving at night, one inevitably encounters the situation where the extended range of high beam headlights are necessary. However, when one encounters oncoming traffic, it is necessary to turn off the high beams to avoid blinding the oncoming driver. This produces a situation in which the driver's eyes suddenly need to refocus from a distant position eliminated by the high beams to a much closer position eliminated by the low beams. This rapid refocusing is difficult on the driver's eyes and may easily result in not seeing an obstacle in the road ahead during the time the eye takes to refocus.

This refocusing must occur every time the high beams are activated and deactivated, which can take a toll on the user's vision, especially those who are elderly and/or may have existing vision impairments. Accordingly, there exists a need for a means by which the rapid refocusing of a driver's eyes from high beam range to low beam range can be reduced. The use of the present invention allows for increased headlight range and reduction of eye re-focusing, all while eliminating the blinding of oncoming drivers, thus providing safe driving conditions for all.

SUMMARY OF THE INVENTION

In view of the foregoing disadvantages inherent in the prior art, it has been observed that there is need for a directional high beam lamp, comprises a lamp first half which has an interior with a first light source, a lamp second half which has an interior with a second light source, a lamp divider which separates the lamp first half interior and the lamp second half interior, a lamp base which is connected to a corresponding high beam lamp socket of a headlight of a vehicle and a plurality of terminals which extend from the lamp base to allow for energization of the first light source and the second light source in an independent manner. A directional high beam switch is provided in a separate embodiment which provides for energization of the first light source and the second light source. The first activation of the directional high beam switch may deactivate only the second light source.

The directional high beam lamp may provide a directional high beam illumination between one or more oncoming vehicles which may be passing each other on a right side or left side of a road. The directional high beam lamp may provide the directional high beam illumination at night. The lamp divider may restrict illumination from the first light source to spill over to the side of the second lamp half, thereby producing selective high beam illumination towards a selected side. The one or more vehicles may engage in high beam illumination.

A portion of one of the conventional high beam illuminations may spill over into an opposing ride side. The portion of the conventional high beam illuminations may spill over into both of the opposing ride sides.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
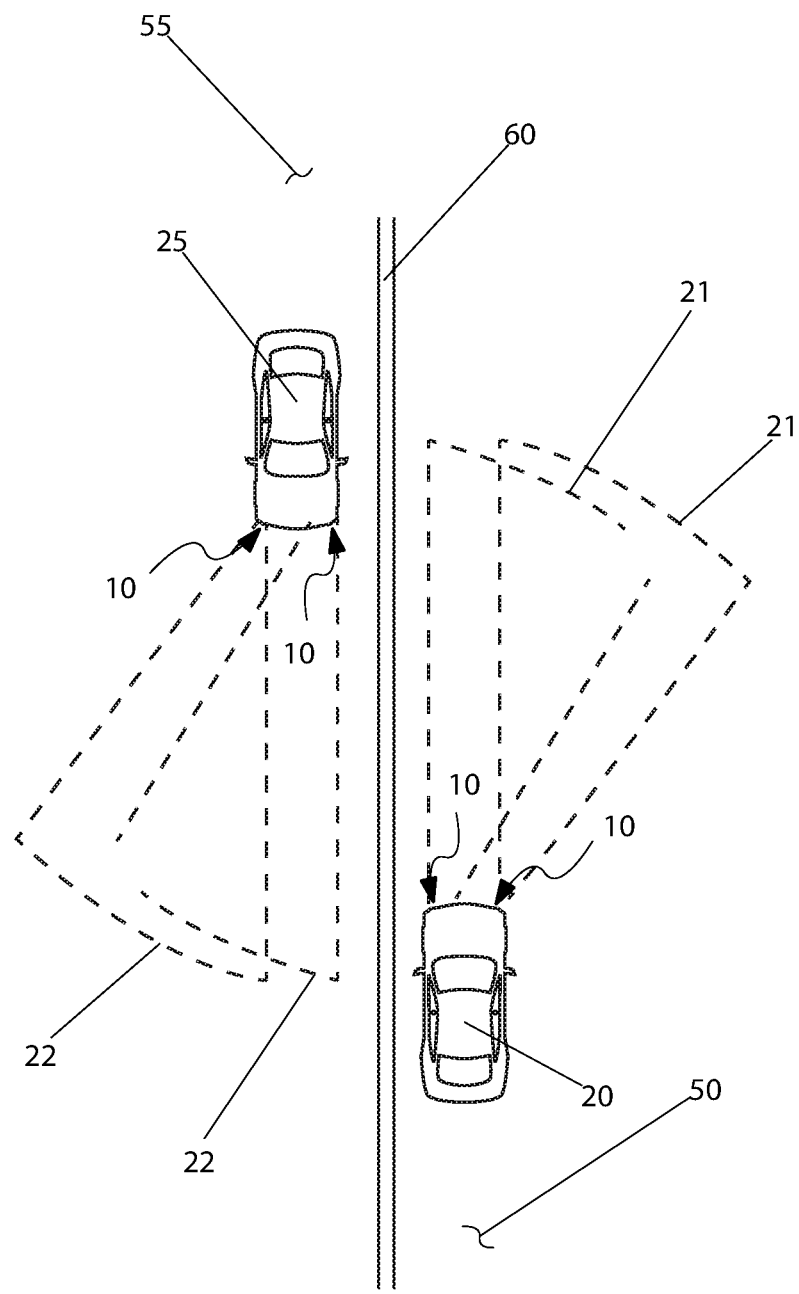
FIG. 1 is an environmental top plan view of an oncoming first vehicle 20 and second vehicle 25 each exhibiting selective directional high beam illumination.

10 directional high beam lamp
11 conventional high beam lamp
12a lamp first half
12b lamp second half
13a first light source
13b second light source
14 lamp base
15 lamp divider
16 terminal
19 directional high beam switch
20 first vehicle
21 first directional high beam illumination
22 second directional high beam illumination
32 conventional high beam illumination
25 second vehicle
50 road first side
55 road second side
60 road divider
70 electrical terminal
75 conventional high beam wand switch
80 switching module

DESCRIPTION OF THE INVENTION

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

The present invention describes a way to provide a directional high beam illumination 21, 22 between oncoming vehicles 20, 25 passing each other on a road 50, 55 in a low light level situation, such as nighttime. This invention is capable of being utilized in locations where the vehicles 50, 55 pass each other on the right side of the road 50, 55, but is equally effective for locations where the vehicles 20, 25 pass each other on the left side of the road 50, 55.

Figure 2:
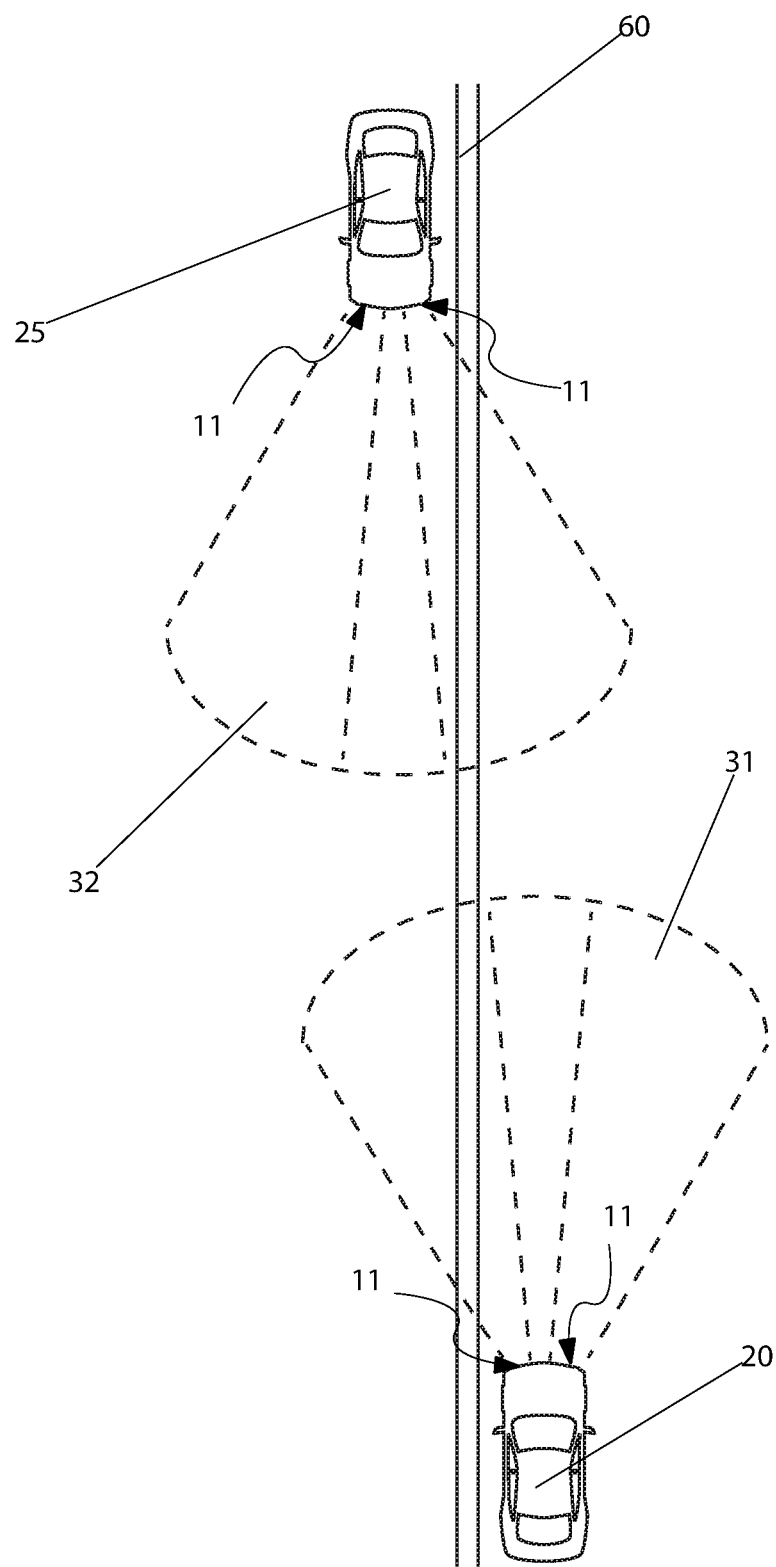
FIG. 2 is a prior art environmental top plan view of an oncoming first vehicle 20 and second vehicle 25 each exhibiting conventional high beam illumination 11.

In the exemplary embodiment where the vehicles 20 25 travel on the right side of the road 50, 55 from each other and as depicted in FIGS. 1 and 2, a first vehicle 20 travels in a first direction on a first road side 50 and a second vehicle 25 travels in an opposing second direction on a second road side 55. A road divider 60 separates the first road side 50 from the second road side 55. The vehicles 20, 25 approach other. In moments where there a low light levels, each vehicle 20, 25 may typically engage in high beam illumination. Referring more closely to FIG. 2, it is shown that conventional high beam lamps 11 provide conventional, high beam illumination 32 is an arcuate path and directed straight away from the vehicle 20, 25. Thus, a portion of the conventional high beam illumination 32 must necessarily spill over into the opposing ride side 50, 55. As can be seen in the FIG. 2 illustration, the first vehicle 20 on the road first side 50 has conventional high beam lamps 11 that provide conventional high beam illumination 32 that spills over into the road second side 55. Similarly, the second vehicle 25 on the road second side 55 has conventional high beam lamps 11 that provide conventional high beam illumination 32 that spills over into the road first side 55. When the vehicles 20, 25 approach each other, the conventional high beam illumination 32 can affect the operation of the particular vehicle 20, 25, thus producing an unsafe driving condition.

FIG. 1 depicts both the first vehicle 20 and second vehicle 25 having selective high beam illumination 21, 22, respectively. The first vehicle 20 travelling on the road first side 50 when employing the high beam lamp 10 can exhibit conventional high beam illumination 32 (as depicted in FIG. 2). When approaching an oncoming second vehicle 25 travelling on the road second side 55, the operator of the first vehicle 20 can selectively switch the high beam lamp 10 from the conventional high beam illumination 32 to the first selective high beam illumination 21, which in this case, provides the first selective high beam illumination 21 to be directed to the right side (i.e., away from the road second side 55). If the second vehicle 25 also employs such a high beam lamp 10, the operator of the second vehicle 25 can selectively switch the high beam lamp 10 from the conventional high beam illumination 32 to the second selective high beam illumination 22, which in this case, provides the second selective high beam illumination 22 to be directed to the right side (i.e., away from the road first side 50). In the case when the first vehicle 20 approaches a second vehicle 25 travelling in the same direction on the same road first side 50, the operator of the first vehicle 20 can selectively switch the high beam lamp 10 from the conventional high beam illumination 32 to the first selective high beam illumination 21 in a similar manner as described.

Figure 3:
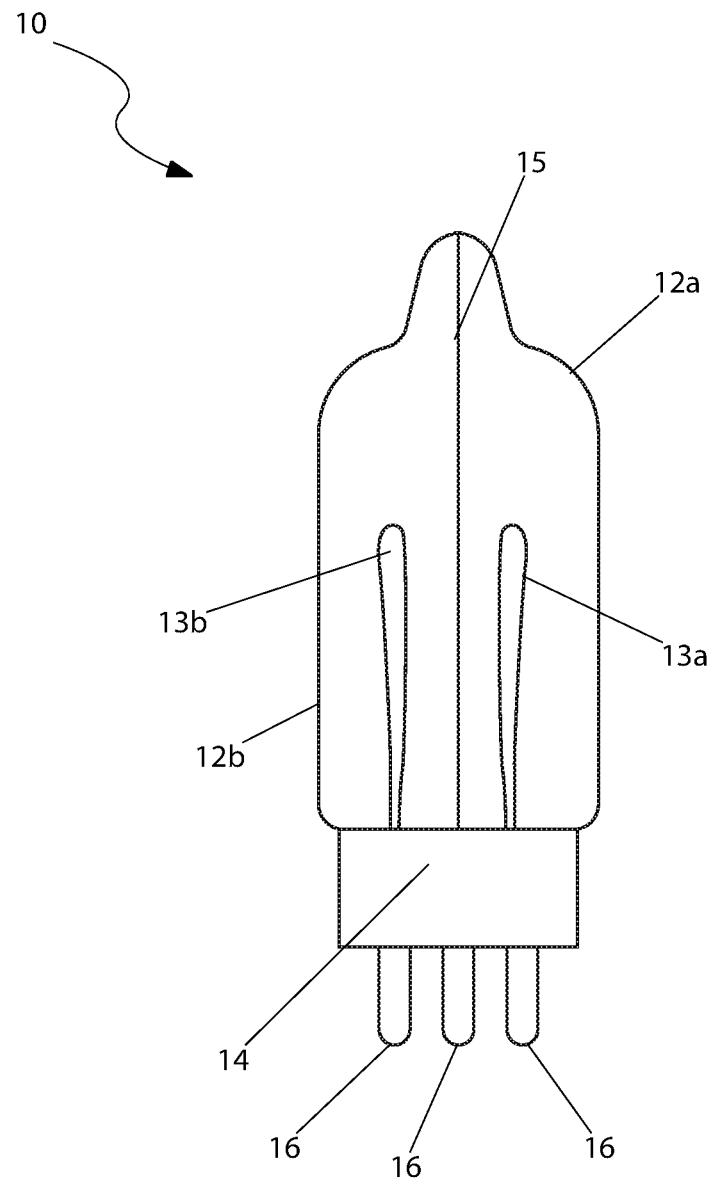
FIG. 3 is a close-up view of a high beam lamp exhibiting selective directional high beam illumination 10, according to a preferred embodiment of the present invention; and, FIG. 4 is an electrical schematic block diagram depicting major electrical components of a directional high beam lamp 10, according to the preferred embodiment of the present invention.

Referring now to FIG. 3, an exemplary embodiment of a high beam lamp 50 is herein described. The high beam lamp 10, supplied in a quantity of two (2) per first vehicle 20 and/or second vehicle 25 (both of which are as shown in FIG. 1), has a lamp first half 12a and a lamp second half 12b, the interiors of which is separated by a lamp divider 15. Within the lamp first half 12a is a first light source 13a and within the lamp second half 12b is a second light source 13b. A lamp base 14 is capable of being physically connected to a corresponding high beam lamp socket of a headlight of a vehicle 20, 25. The lamp base 14 is provided with multiple terminals 16 to allow for energization of the first light source 13a and/or the second light source 13b in an independent manner by a directional high beam switch 19 which will be described in greater detail herein below. The lamp first half 12a and the lamp second half 12b extend from the lamp base 14 from the opposite side of the lamp base 14 where the terminals extend 16. The lamp first half 12a and the lamp second half 12b are directly co-extensively adjacent to each other. The lamp divider 15 is co-extensive between the lamp first half 12a and the lamp second half 12b.

In one (1) embodiment, upon activation of the conventional high beam wand switch in the vehicle 20, 25, a conventional high beam illumination 32 (as shown in FIG. 2) is produced with the high beam lamp 10 (i.e., both light sources 13a, 13b are energized). A first activation of the directional high beam switch 19 can deactivate only the second light source 13b. The first light source 13a remains illuminated. The lamp divider 15 restricts illumination from the first light source 13a to spill over to the side of the second lamp half 12b, thereby producing the selective high beam illumination 21, 22 towards the selected side. In the case of usage in locations where vehicles 20, 25 pass on the right side of each other, the lamp first half 12a is located on the right, which, when activated by the directional high beam switch 19, provides selective high beam illumination 21, 22 towards the right of the vehicle 20, 25. In another embodiment, successive activation of the directional high beam switch 19 can effectively "toggle" between activation of only the first light source 13b, and simultaneous activation of both light sources 13a, 13b.

Figure 4:
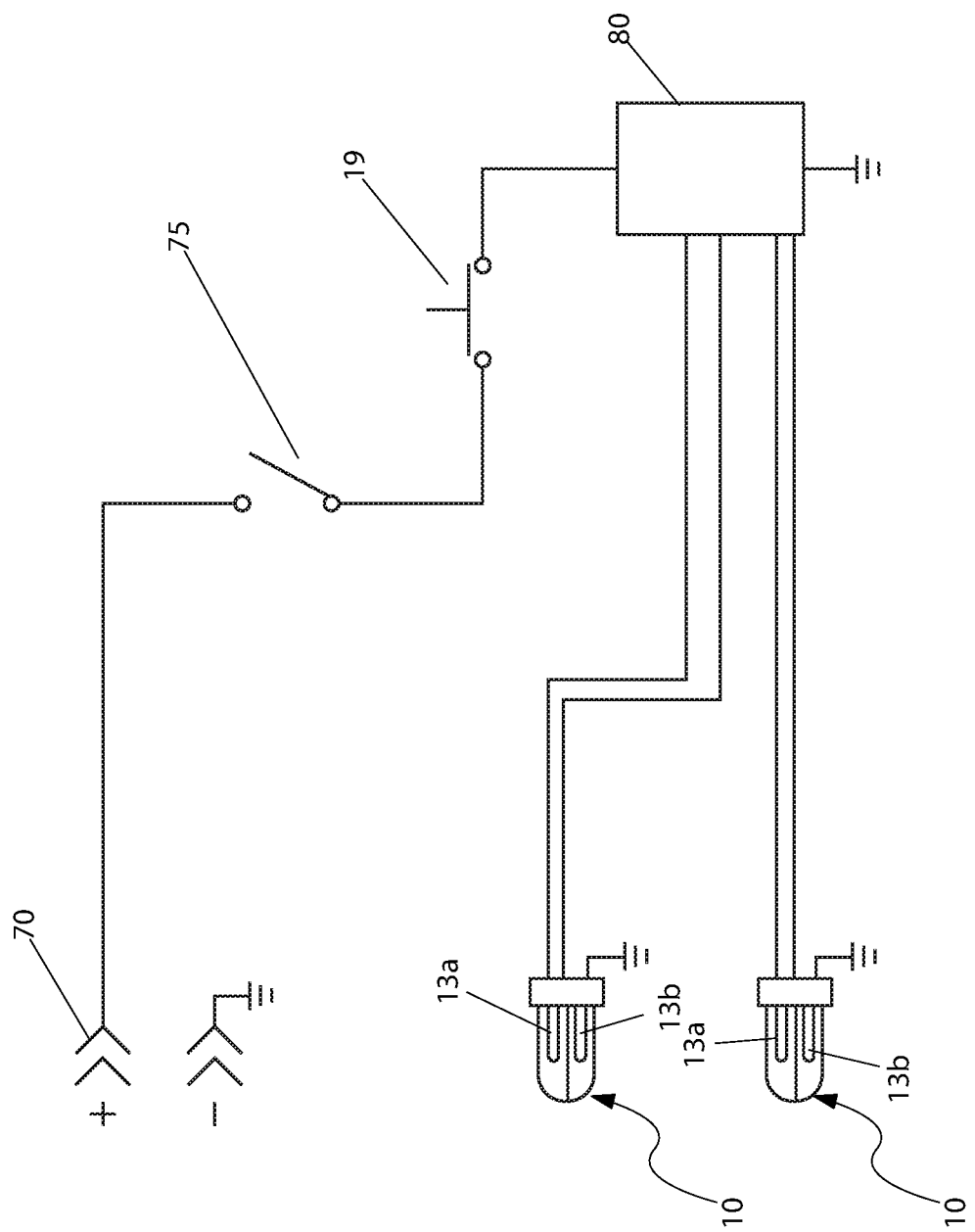

Referring to FIG. 4, an electrical schematic block diagram depicting major electrical components of a directional high beam lamp 10, according to the preferred embodiment of the present invention is disclosed. Electrical power is provided via an electrical terminal 70. Power then flows to the conventional high beam wand switch 75 that allows for the remainder of the circuit to be energized or de-energized depending on the driver's needs. Resultant power then flows to the directional high beam switch 19 which is in electrical communication with a switching module 80, envisioned to be a computer controlled programmable device such as single board computer (SBC). However, other methods of control such as discrete logic, relay logic, or the like may also be utilized. As such, the exact method of control provided by the switching module 80, is not intended to be a limiting factor of the present invention. The switching module 80 provides selective electrical communication between the first light source 13a and second light source 13b in each of the directional high beam lamps 10. The directional high beam switch 19 can be mounted within the interior of the vehicle 20, 25, (as shown in FIGS. 1 and 2) at a location easy for the operator to activate when needed.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A directional high beam lamp, comprising:
a lamp first half having an interior with a first light source;
a lamp second half having an interior with a second light source;
a lamp divider separating the lamp first half interior and the lamp second half interior;
a lamp base adapted to a corresponding high beam lamp socket of a headlight of a vehicle; and
a plurality of terminals extending from the lamp base to allow for energization of the first light source and the second light source in an independent manner;
wherein the lamp first half and the lamp second half extend from the lamp base from the opposite side of the lamp base where the terminals extend;
wherein the lamp first half and the lamp second half are directly co-extensively adjacent to each other;
wherein the lamp divider is co-extensive between the lamp first half and the lamp second half; and
wherein the one or more vehicles engage in high beam illumination.

2. The directional high beam lamp according to claim 1, wherein the directional high beam lamp provides a directional high beam illumination between one or more oncoming vehicles passing each other on a road.

3. The directional high beam lamp according to claim 2, wherein the directional high beam lamp provides the directional high beam illumination between the one or more vehicles passing each other on a right side of the road.

4. The directional high beam lamp according to claim 2, wherein the directional high beam lamp provides the directional high beam illumination between the one or more vehicles passing each other on a left side of the road.

5. The directional high beam lamp according to claim 2, wherein the directional high beam lamp provides the directional high beam illumination is at night.

6. The directional high beam lamp according to claim 1, wherein the lamp divider restricts illumination from the first light source to spill over to the side of the second lamp half, thereby producing selective high beam illumination towards a selected side.

7. The directional high beam lamp according to claim 1, wherein a portion of one of the conventional high beam illuminations spill over into an opposing ride side.

8. The directional high beam lamp according to claim 7, wherein the portion of the conventional high beam illuminations spill over into both of the opposing ride sides.

9. A directional high beam lamp, comprising:
a lamp first half having an interior with a first light source;
a lamp second half having an interior with a second light source;
a lamp divider separating the lamp first half interior and the lamp second half interior;
a lamp base adapted to a corresponding high beam lamp socket of a headlight of a vehicle;
a plurality of terminals extending from the lamp base to allow for energization of the first light source and the second light source in an independent manner; and
a directional high beam switch providing energization of the first light source and the second light source;
wherein the lamp first half and the lamp second half extend from the lamp base from the opposite side of the lamp base where the terminals extend;
wherein the lamp first half and the lamp second half are directly co-extensively adjacent to each other;
wherein the lamp divider is co-extensive between the lamp first half and the lamp second half; and
wherein the one or more vehicles engage in high beam illumination.

10. The directional high beam lamp according to claim 9, wherein the directional high beam lamp provides a directional high beam illumination between one or more oncoming vehicles passing each other on a road.

11. The directional high beam lamp according to claim 10, wherein the directional high beam lamp provides the directional high beam illumination between the one or more vehicles passing each other on a right side of the road.

12. The directional high beam lamp according to claim 10, wherein the directional high beam lamp provides the directional high beam illumination between the one or more vehicles passing each other on a left side of the road.

13. The directional high beam lamp according to claim 10, wherein the directional high beam lamp provides the directional high beam illumination at night.

14. The directional high beam lamp according to claim 9, wherein the lamp divider restricts illumination from the first light source to spill over to the side of the second lamp half, thereby producing selective high beam illumination towards a selected side.

15. The directional high beam lamp according to claim 9, wherein a portion of one of the conventional high beam illuminations spill over into an opposing ride side.

16. The directional high beam lamp according to claim 15, wherein the portion of the conventional high beam illuminations spill over into both of the opposing ride sides.

17. The directional high beam lamp according to claim 9, wherein first activation of the directional high beam switch deactivates only the second light source.

* * * * *